June 27, 1944.    G. KEINATH    2,352,266
JEWEL BEARING AND METHOD OF MAKING SAME
Filed April 8, 1942
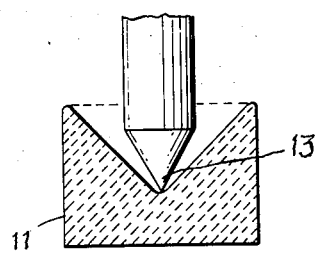
FIG. I.
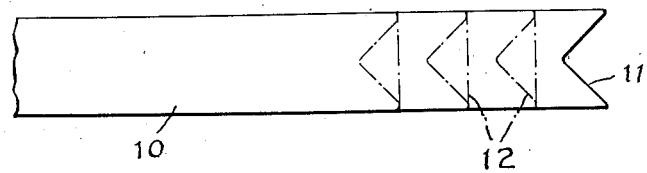
FIG. 2.
INVENTOR.
GEORGE KEINATH
BY  Carl E. Ring
ATTORNEYS Patented June 27, 1944

2,352,266

UNITED STATES PATENT OFFICE 2,352,266

JEWEL BEARING AND METHOD OF MAKING SAME

George Keinath, Larchmont, N. Y.

Application April 8, 1942, Serial No. 438,113

10 Claims. (Cl. 308—159)

This invention relates to jewel bearings and is more particularly concerned with jewel bearings made of synthetic materials.

At present almost all of the jewel bearings now employed in this country are made from natural or synthetic sapphires, rubies and similar materials of very hard properties. The material used in jewel bearings for watches, instruments and the like generally has a hardness of between 7.0 and 9.0 on the Mohs scale. In some cases, glass and metals have been used, but the results in the use of these latter-mentioned materials have not been altogether satisfactory.

With the increasing use of instruments of a delicate nature, a considerable demand for jewel bearings has arisen. The bearings heretofore used for this purpose are expensive due to the scarcity of the crystalline quartz material and the fabricating methods applied for making bearings thereof.

The present invention is intended to provide a new type of bearing and bearing material which affords the use of a more amply available substance and the application of an improved fabricating method, both factors tending to reduce the cost of such bearings while ensuring bearing qualities far superior to glass and metal bearings.

The bearings of the present invention are made from fused quartz prepared as will be hereinafter described. It has been found that fused quartz of a high degree of purity has a hardness of between 7.5 and 8.5 on the Mohs scale.

For a better understanding of the invention, reference is made to the accompanying drawing in which:

Figure 1 is a sectional view of a jewel bearing and a pivot.

Figure 2 is a detail of the jewel bearing showing the manner of manufacture.

The bearing subject of this invention is prepared by providing a rod 10 of fused quartz of a high degree of purity. This rod is generally several inches in length and has a diameter of one or more millimeters in accordance with the diameter of the jewel bearing desired. The rods of fused quartz are then prepared in a manner similar to the machining of small machine parts from metal. One end 11 of the rod 10 is then drilled to form a bearing surface generally in the form of a V-groove of a desired size and shape. After the grinding of the V-groove it is then polished to form a suitable bearing surface.

The rod so drilled is then cut with a diamond saw or other suitable cutting tool to a proper length which is generally close behind the apex of the V-groove as shown at 12. Upon the severance of the drilled portion from the remainder of the rod, the rod is ready for grinding the V-groove for the next jewel. Character 13 indicates a pivot in the bearing.

In the jewel bearing shown in the accompanying drawing a concave V-groove is cut or drilled in the face of the bearing, but the shape or bearing surface of the jewel may be of any desired or useful shape, and this invention is not limited to jewel bearings having a concave V-groove.

To assure a perfect fit and at the same time to provide means to protect the fused quartz material when in the process of manufacture to jewel bearings, it has been found advantageous to coat the rods with a soft metal, such as tin or lead, or with a plastic, lacquer or similar material which will provide a relatively soft yet a durable coating. Such a coating may be obtained by the usual methods such as spraying, dipping, brushing or other suitable means.

Such a coating not only protects the rods and facilitates the production of the bearings, but also provides a means for effecting a tight fit when the finished jewel is mounted in a transverse, without extra labor or machinery. With such a protective coating, the jewel may be easily pressed into the transverse, while at the same time assure a tight fit with rather wide tolerances of jewel diameter as well as for hole diameter.

A jewel bearing of this type and prepared in this manner eliminates many costly steps from the methods used in the present manufacture. Under the present methods of manufacture, the raw material is first sliced, then cut to prisms and finally small disks are cut from raw material such as sapphire or synthetic sapphire, and then when of a desired size, the rounded disks are drilled to form a V-groove. Of these operations, the cutting and shaping of the material before the drilling is the more difficult and expensive. Hence by the use of the method of the present invention, the more costly step has been eliminated in addition to providing a new material which is more suitable and available than the materal now employed.

Fused quartz jewel bearings are especially advantageous when mounted in a metal transverse, since the different coefficients of expansion assure a tight and close fit.

Jewel bearings made in accordance with this invention have also been found superior in other respects to jewel bearings made of other materials such as synthetic sapphire, agate and the like. One of the reasons for this superiority lies in the fact that fused quartz can withstand a high degree of heat, without decomposition, whereas jewel bearings of topaz and agate cannot withstand heat, and tend to decompose at high temperatures. In addition, where synthetic sapphire is submitted to sudden changes in temperature, it is liable to crack or fracture, whereas on the other hand, fused quartz will withstand sudden changes of temperature without this objection. It is known that fused quartz has a very small coefficient of expansion when there are temperature changes, while rock crystal, sapphire, and other materials employed for jewel bearings have relatively large coefficients of expansion. For example, quartz crystal, which has two definite and distinct axes, has two different coefficients of expansion.

Some of the materials from which jewel bearings are produced are the following coefficients of thermal expansion which illustrate the advantages of fused quartz:

| | | |
|---|---|---|
| Quartz crystal parallel to axis | 8.0 | $10^{-6}$ |
| Quartz crystal perpendicular to axis | 13.0 | $10^{-6}$ |
| Fused quartz | 0.5 | $10^{-6}$ |
| Brass (approximately) | 18.0 | $10^{-6}$ |
| Glass (approximately) | 10.0 | $10^{-6}$ |

Due to these thermal characteristics of fused quartz, jewel bearings produced in this manner may be submitted to temperatures of 800° centigrade or even more without cracking, and with so little thermal expansion that the change is negligible.

Generally jewel bearings are mounted in a metal screw, with means for holding the jewel bearing in place. Such a metal screw, generally of brass, must be exact in its measurement and must also be carefully machined, and as a consequence, is difficult, tedious and expensive to manufacture. However, with a jewel bearing of fused quartz, made in accordance with this invention, the necessity of the metal screw for holding the jewel bearing in position is obviated, since the bearing of this invention may be molded into a transverse of metal or insulating material. If the transverse is of metal, it may be a die-casting, and the difference of the coefficient of expansion of the fused quartz jewel bearing and the material of the transverse will secure a tight fit. Likewise, the jewel bearing of this invention might be die-cast in a small screw and thus eliminate the necessity of the machining.

I claim:

1. The method of producing jewel bearings which comprises the steps of fusing essentially pure quartz crystals into an elongated rod of a diameter corresponding to that of the bearings to be produced, shaping an end of said rod to form a bearing surface, cutting said rod below the bearing surface, and repeating said shaping and cutting to obtain a plurality of bearings with substantially finished bearing surfaces from said rod.

2. The method of producing jewel bearings which comprises the steps of fusing substantially pure quartz into an elongated rod of a diameter corresponding to that of the bearings to be produced, shaping one end of said rod to form a bearing surface, polishing said surface, cutting said rod below the bearing surface, and repeating said shaping, polishing and cutting to obtain a plurality of bearings with substantially finished bearing surfaces from said rod.

3. The method of producing jewel bearings which comprises the steps of fusing the jewel material into a rod of a desired diameter, coating said rod with a relatively soft material, and cutting said rod to obtain a plurality of bearings with substantially finished bearing surfaces from said rod.

4. The method of producing jewel bearings which comprises the steps of fusing quartz into a rod of a desired bearing diameter, coating said rod with a soft metal, shaping and polishing one end of said rod to form a finished bearing surface, cutting said rod below the bearing surface, and repeating said shaping, polishing and cutting to obtain a plurality of bearings from said rod.

5. The method of producing jewel bearings which comprises the steps of fusing quartz into a rod, coating said rod with a relatively soft material, machining the peripheral surface of said coated rod to a desired diameter, shaping the end of said rod to form a finished bearing surface, cutting said rod close to said bearing surface, and repeating said shaping and cutting to obtain a plurality of substantially finished bearings from said rod.

6. The method of producing jewel bearings which comprises the steps of fusing the jewel material into a rod of a desired diameter, drilling one end of said rod to form a bearing surface, cutting said rod close to said bearing surface, and repeating said drilling and cutting to obtain a plurality of substantially finished bearings from said rod.

7. The method of producing jewel bearings which comprises the steps of fusing jewel material into a rod of a desired diameter, machining the end of said rod to form a finished bearing surface, cutting the machined end, and repeating the machining and cutting to obtain a plurality of jewel bearings.

8. A jewel bearing comprising a jewel body of substantially pure fused quartz having an uncut peripheral surface, a cut bearing surface, a cut back surface, and a coating of relatively soft material covering only said peripheral surface.

9. A jewel bearing comprising a jewel body of substantially pure fused quartz having an uncut peripheral surface of rectilinear generatrix and uniform cross section as obtained from transversely cutting a rod, a machined bearing surface, and a plane cut back surface.

10. A jewel bearing comprising a jewel body of substantially pure fused quartz having an uncut peripheral surface of rectilinear generatrix and uniform cross section, a machined bearing surface, a cut back surface, and a coating of relatively soft material covering only said peripheral surface and having an outer surface machined to measure.

GEORGE KEINATH.